United States Patent

Sudo

[11] Patent Number: 6,070,068
[45] Date of Patent: May 30, 2000

[54] COMMUNICATION TERMINAL DEVICE AND METHOD FOR CONTROLLING A CONNECTING STATE OF A CALL INTO A DESIRED CONNECTION STATE UPON A PREDETERMINED OPERATION BY A USER

[75] Inventor: Fukuharu Sudo, Tokyo, Japan

[73] Assignee: Sony Corporation, Tokyo, Japan

[21] Appl. No.: 08/818,564

[22] Filed: Mar. 14, 1997

[30] Foreign Application Priority Data

Mar. 19, 1996 [JP] Japan .................................. 8-090079

[51] Int. Cl.⁷ ........................................................ H04Q 7/32
[52] U.S. Cl. .......................... 455/414; 455/422; 379/142
[58] Field of Search .................................... 455/566, 415; 379/201, 204, 205, 215, 213, 428, 433, 915

[56] References Cited

U.S. PATENT DOCUMENTS

| 5,363,429 | 11/1994 | Fujisawa | 455/422 |
| 5,657,372 | 8/1997 | Ahlberg et al. | 455/414 |
| 5,754,636 | 5/1998 | Bayless et al. | 379/142 |

*Primary Examiner*—William Cumming
*Attorney, Agent, or Firm*—Jay H. Maioli

[57] ABSTRACT

In a communication terminal device, the connecting state of a call can certainly and easily be controlled without learning troublesome operating methods which are different depending on the connecting state of a call by providing controller for displaying processing items available to a call a display and controlling the call into the connecting state corresponding to the processing item which is selected and determined by the user's operation of an input unit, the user can control the connecting state of the call by merely selecting the desired processing item.

32 Claims, 10 Drawing Sheets

FIG. 6A  ↓ CALL INCOMING

FIG. 6B  ↓ CLICK

FIG. 6D  ↓ CLICK

FIG. 6F  ↓ CLICK

↓ CALL INCOMING

↓ DOWN

↓ CLICK

↓ CALL INCOMING

↓ DOWN, DOWN

↓ DOWN

↓ DOWN

↓ CLICK

TURN ON CALL CONTROL KEY

DOWN

CLICK

TURN ON CALL CONTROL KEY

DOWN

CLICK

DOWN

CLICK

COMMUNICATION TERMINAL DEVICE AND METHOD FOR CONTROLLING A CONNECTING STATE OF A CALL INTO A DESIRED CONNECTION STATE UPON A PREDETERMINED OPERATION BY A USER

BACKGROUND OF THE INVENTION

1. Field of the Invention

This invention relates to a communication terminal device and the method, and more particularly, is applicable to a portable telephone apparatus of the Global System for Mobile communications (GSM) which has been standardized in Europe.

2. Description of the Related Art

In recent years, the diffusion of portable telephone apparatuses is remarkable, and, in proportion to it, a great variety of functions are added to the portable telephone apparatuss. For example, in a portable telephone apparatus of the GSM system described above, if a call incoming from the third party is received when talking, the call in progress and the call newly received can be call-controlled respectively into the desired connecting state (hereinafter, it is referred to as a call waiting service). For instance, the call in progress can be suspended and a newly received call can be connected, or disconnecting the call presently talking and connect with the newly received call, or including the call received among the present call and talk with two parties at the same time, i.e., switching into a tripartite call, or disconnecting the call received and can continue talking with the present call.

The above call controls are executed by performing a predetermined operation determined by a standard in the GSM system. For instance, in case of suspending the call in progress and talk with the call received, "send" key should be pushed after pushing "2" key, and in the case of disconnecting the call in progress and talk with the call received, "send" key should be pushed after pushing the "1" key. Furthermore, to switch into a tripartite call, "3" key should be pushed and then the send key must be pushed, and to disconnect the call received and continue the call in progress "0" key should be pushed and then the send key.

The operating methods of these call controls have been disclosed in detail in the standard literature, "European digital cellular telecommunications system (Phase 2): Man-Machine Interface (MMI) of the Mobile Station (MS) (GSM 02.30)" issued by the European Telecommunication Standard Institute (ETSI).

The aforementioned call waiting service is a very convenient function. However, it cannot necessarily be said that it is a good function in usability from the user's point of view because the numeral to be entered varies depending on the connecting state of a call. Practically, these operating methods of call controls are very difficult to learn for the user, and often cause erroneous operations. It is no problem provided that erroneous operation does not trouble the other party, but if one of the parties were cut off by mistake when switching into a tripartite talk, for example, it causes the other party much trouble.

As a method for solving this problem, it is considered that the user carries a simple handbook explaining call control operating methods with him. However, it does not improve the usability of the user, and it seems that this is not a sufficient solution.

SUMMARY OF THE INVENTION

In view of the foregoing, an object of this invention is to provide a communication terminal device in which the connecting state of a call can certainly and easily be controlled without learning the troublesome operating methods which are different depending on the connecting state of the call.

The foregoing object and other objects of the invention have been achieved by the provision of a communication terminal which provides control means for displaying processing items available to a call on display means and controlling the call into the connecting state corresponding to the processing item which is selected and determined by the user's operation of input means.

Thus, since the processing items available to the call is displayed on the display means and the user selects a desired processing item out of the processing items, the user can control the connecting state of the call by merely selecting the desired processing item.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6A to 6G are schematic diagrams showing the screen layout of a call control screen according to the first embodiment;

DETAILED DESCRIPTION OF THE EMBODIMENT

Figure 1:
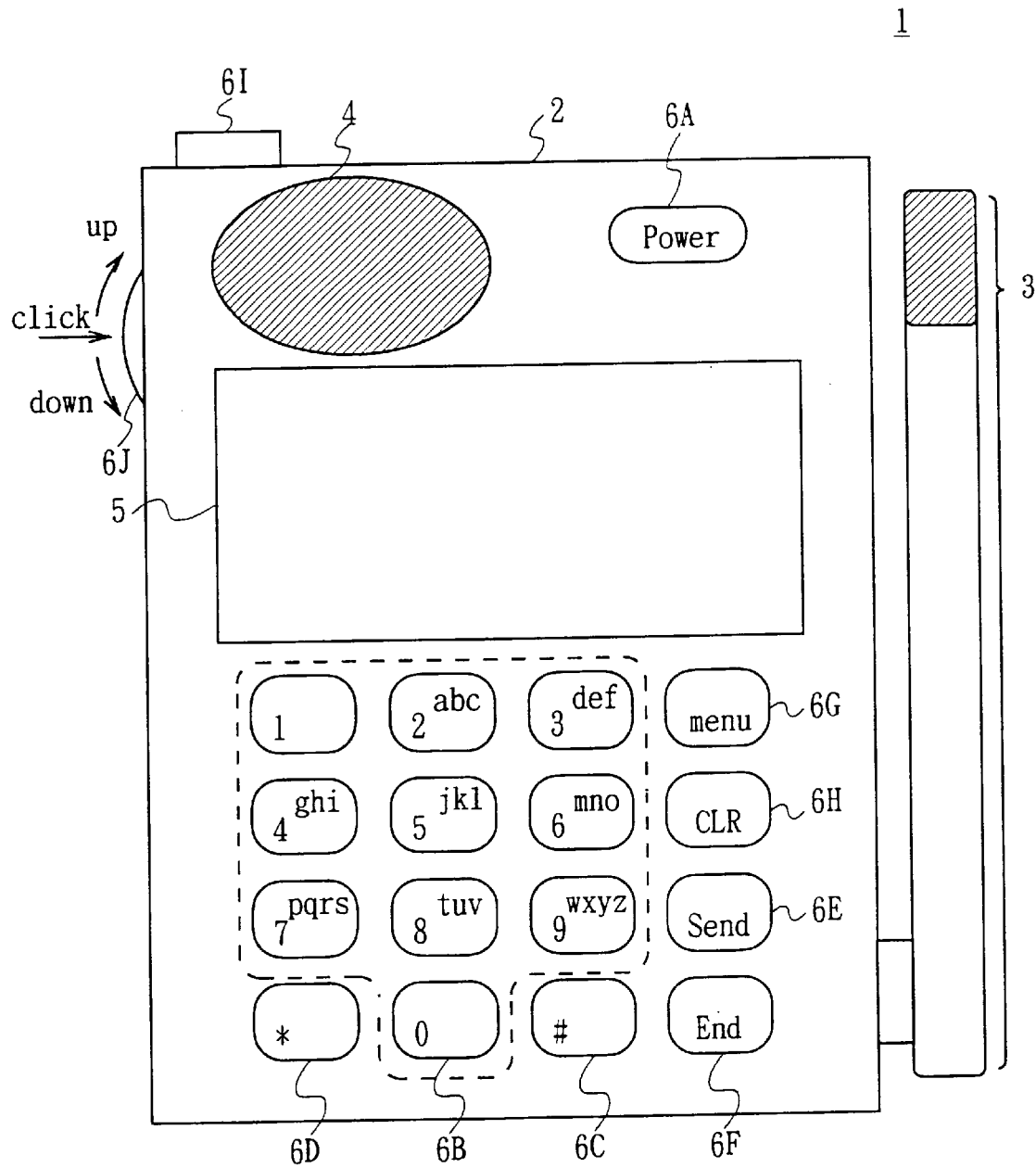
FIG. 1 is a schematic diagram showing the general construction of a portable telephone apparatus according to an embodiment of the present invention.
Figure 2:
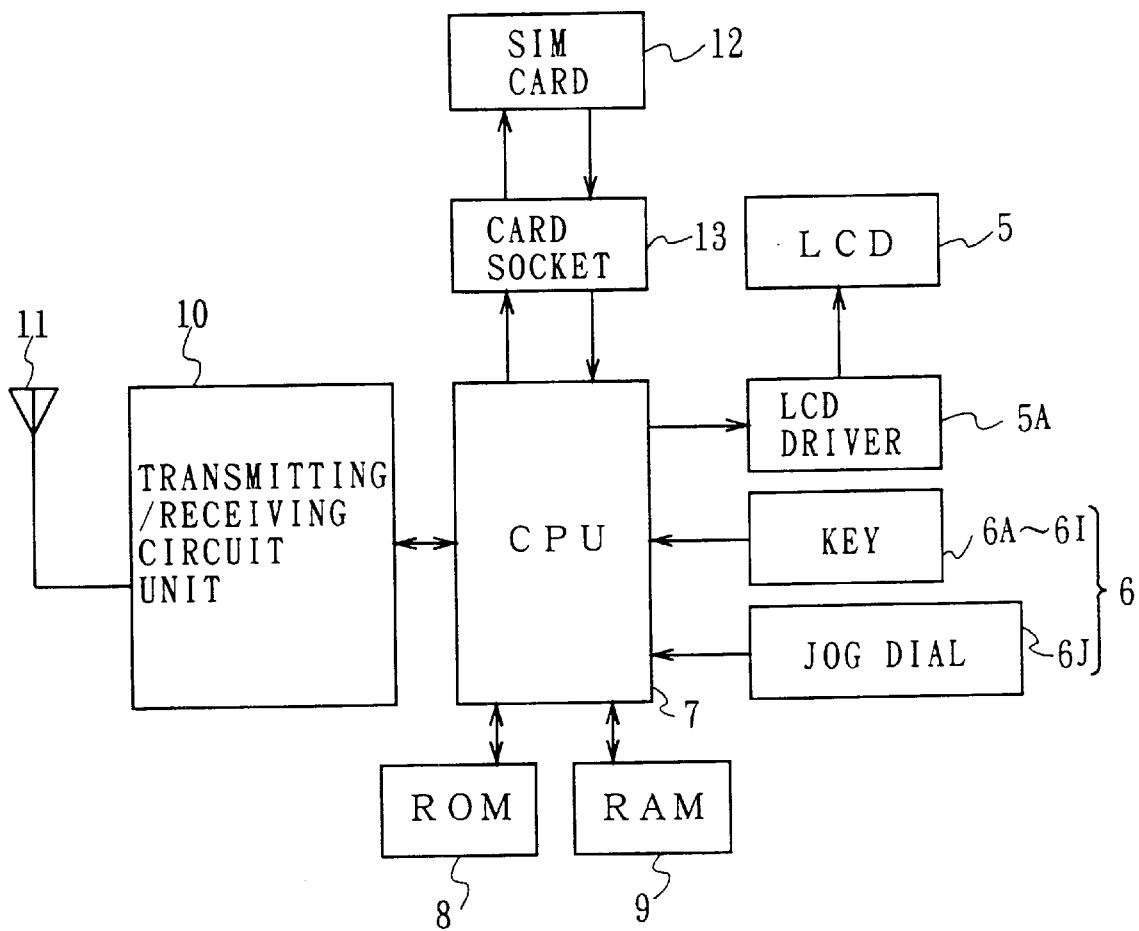
FIG. 2 is a block diagram showing a circuit configuration provided in the portable telephone apparatus.

Preferred embodiments of this invention will be described with reference to the accompanying drawings:

Firstly, the general construction and circuit configuration of a portable telephone apparatus 1 applying the present invention will be described with reference to FIGS. 1 and 2. This portable telephone 1 is mainly composed of the body of apparatus 2 and an arm microphone 3 attached to the side of the body and being adjustable (opens and closes freely). Therefore, the size of the portable telephone apparatus 1 can be further reduced by closing the arm microphone 3 except when in use.

In the arm microphone 3, in addition to the function to control on-hook or off-hook by linking to the open/close operation, a function to cancel operations other than a specific key when in a closed state (hereinafter, it is referred to as key lock function) is provided. In this connection, this key lock state can be canceled by opening the arm microphone 3.

By providing such key lock function, an erroneous operation such as pushing the operation key by mistake can be prevented when the portable telephone apparatus 1 is put in a pocket or a bag.

On the other hand, various operation keys and processing circuits are provided in the body of apparatus 2. On the surface of the body of apparatus 2, a liquid crystal display (LCD) 5 and a plurality of operation keys 6 to which various functions are allocated are provided in addition to a speaker 4 coupled with the arm microphone 3. And, a central processing unit (CPU) 7 which uses these as input/output devices is built in the apparatus body.

The CPU 7 controls the liquid crystal display 5 via a liquid crystal display driver 5A and displays various kinds of information with the font of suitable sizes. Further, the CPU 7 controls a transmitting/receiving circuit unit 10 and transmits and receives various kinds of information (e.g., an audio signal or various control signals to/from the base station device through an antenna 11 connected to the transmitting/receiving circuit unit 10. The CPU 7 operates based on the program stored in a read only memory (ROM) 8 and the data read in a random access memory (RAM) 9.

Moreover, a card socket 13 is connected to the CPU 7, and all of management information on the subscriber will be read out from a subscriber ID card 12 (in this embodiment, it is the subscriber identity module (SIM) card) inserted to the card socket and utilized for controlling.

In this connection, the liquid crystal display 5 in which pixels of thirty-two dots by ninety-seven dots are arrayed in a matrix is used for, and information can be displayed with two kinds of fonts in utilizing these dots. One is a small font in which one character is displayed with seven dots by five dots, and the other is a large font with fifteen dots by eight dots. Accordingly, if the small font is used, four characters by sixteen characters can be displayed, and if the large font is used, 2 characters by 10 characters can be displayed.

Here, the large font is used for displaying the character entered by the user, and the small font is used for the message from the device side, as a rule. However, if the number of characters inputted by the user exceeds the fixed number (e.g., approximately twenty characters), the font size is automatically shifted from the large font to the small font.

By providing such font shifting function, the user can input characters with the large characters confirming the input contents when the number of characters entered is small and thus input errors can be reduced. On the other hand, even if the number of characters is large, input information on the same item can be confirmed on one screen, and thus input contents can be easily grasped.

Secondly, the operation keys 6 provided on the body of apparatus 2 will be described. In this embodiment, the operation key 6 consist of ten keys, i.e., a power key 6A, numeral keys 6B of "0" to "9", "#" key 6C, "*" key 6D, send key 6E, end key 6F, menu key 6G, clear key 6H, record key 6I, and jog dial 6J. Of these keys, the operation keys 6A to 6H are placed on the front of the apparatus body 2, and the remaining two operation keys 6I and 6J are placed on the side of the apparatus body 2.

The main function allocated to each operation key is as follows: The power key 6A is a key for supplying power to the internal circuits of the apparatus body 2, and the power is supplied by the first push operation and the power supply is cut off by the second push operation. However, if a personal identity number (PIN) is not inputted by the user in thirty seconds after the power is turned on by the power key 6A, the CPU 7 detects this and automatically turns the power off. Thus, the apparatus can be prevented from its power remaining ON due to the error operation.

Then, ten numeral keys 6B will be described. These ten numeral keys 6B are used for inputting letters in addition to numerals. In this embodiment, plural letters are allocated to eight numeral keys "2" to "9" respectively exclusive of "0" and "1" keys, and the letters can be entered by these. For example, "a" to "c" are allocated to the "2" key, and "d" to "f" to the "3" key—also other letters are allocated to the other keys in the same manner.

In the case of inputting letters, letters can be entered in succession by pushing the key, i.e., a first letter can be entered by pushing the same key once, a second letter can be entered by pushing the same key twice, and a third letter can be entered by pushing the same key three times. Furthermore, these numeral keys 6B can be used for selecting a display items, and also when a predetermined number is pushed while the telephone number list is displayed, the screen can be switched to an item corresponding to the number and a cursor display can be moved on that item.

The send key 6E is a key for inputting an operation start command when making a call to the telephone number manually entered with the numeral keys 6B and the telephone number of the other party selected from the telephone list screen. This key is also used for calling up the past dial record.

The end key 6F is a key for inputting a call end command. In this connection, the call end command can be entered also by closing the arm microphone 3.

The menu key 6G is a key which is used for switching the screen to be displayed on the liquid crystal display 5 between the initial screen and the menu screen. In the portable telephone apparatus 1, time is displayed as the initial screen. If the menu key 6G is pushed in this state, the display can be switched to the menu screen for displaying various setting items. Furthermore, in this state, if a predetermined operation would be conducted with the jog dial 6J that will be described later, the menu screen can be switched one by one as if turning pages. Furthermore, in this state, if the clear key 6H is pushed, the screen can be returned to the preceding screen one by one as if turning of pages.

Moreover, if the menu key 6G is pushed while the menu screen is displayed, it can be returned immediately to the initial screen no matter where the screen is.

Furthermore, a function as the only operation key capable of unlocking the key lock state is assigned to the menu key 6G. More specifically, as described above, in the state where the arm microphone 3 is closed, it is normally in a key lock state. However, if the menu key 6G is pushed, it can be shifted from the key lock state to the key active state.

The record key 6I is a key for recording a conversation on a call and playing back the recorded conversation. The key 6I is attached to the opposite side to the arm microphone 3 on the upper surface of the main body of apparatus 2 so that it can be operated with the hand holding the main body 2.

Lastly, the jog dial 6J having the main function in ten operation keys will be described. The jog dial 6J is provided in the vicinity of the speaker 4, and on the upper part of the opposite side to the arm microphone 3 of the main body of 2 and can be operated with the hand holding the main body of apparatus 2 similar to the record key 6I.

Figure 3:
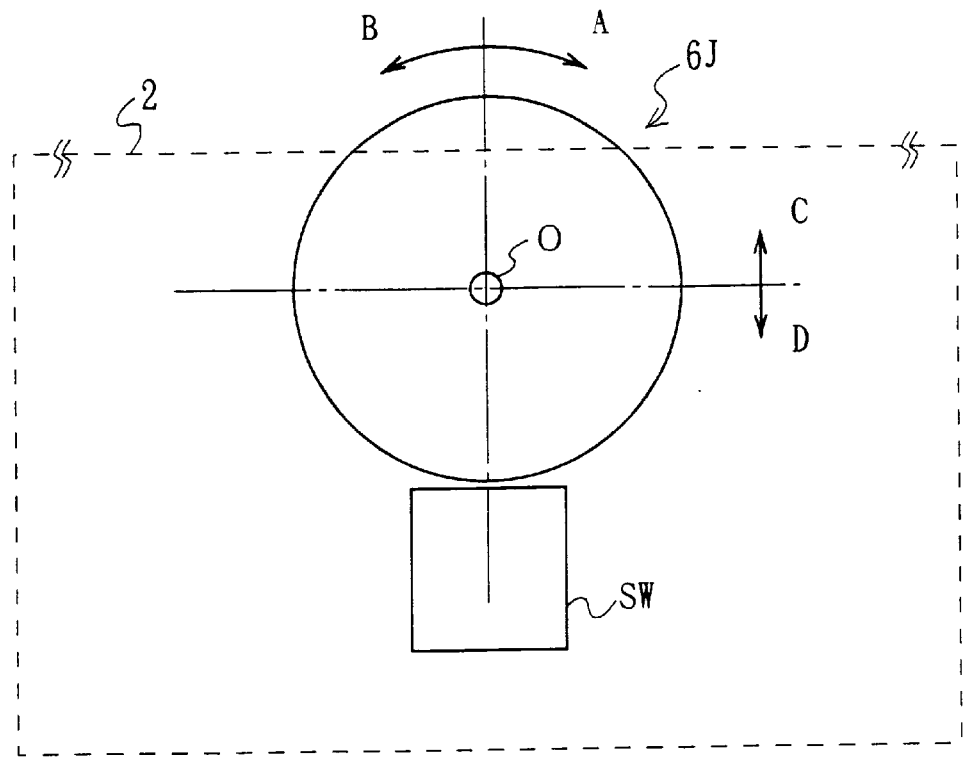
FIG. 3 is a schematic diagram showing the general mechanism of a jog dial.

This jog dial 6J can be operated independently in the circumferential direction and in the radial direction. And as shown in FIG. 3, this is composed of a disc member (forming a rotary encoder) rotating in the circumference direction centering around a rotary shaft O (an arrow A and an arrow B), and a slide board (not shown) capable of sliding in the radial direction (an arrow C and an arrow D), and a slide switch SW.

In this connection, the slide board and the slide switch SW are urged to the arrow C direction. The rotary shaft O is fixed to the slide board. Thus, if the jog dial 6J is pushed in the arrow D direction, the rotary encoder slides together with the slide board and pushes down the slide switch SW so as to control into an ON state. The CPU 7 judges whether the jog dial 6J was clicked or not by detecting the ON/OFF state of the slide switch SW.

Figure 4A:
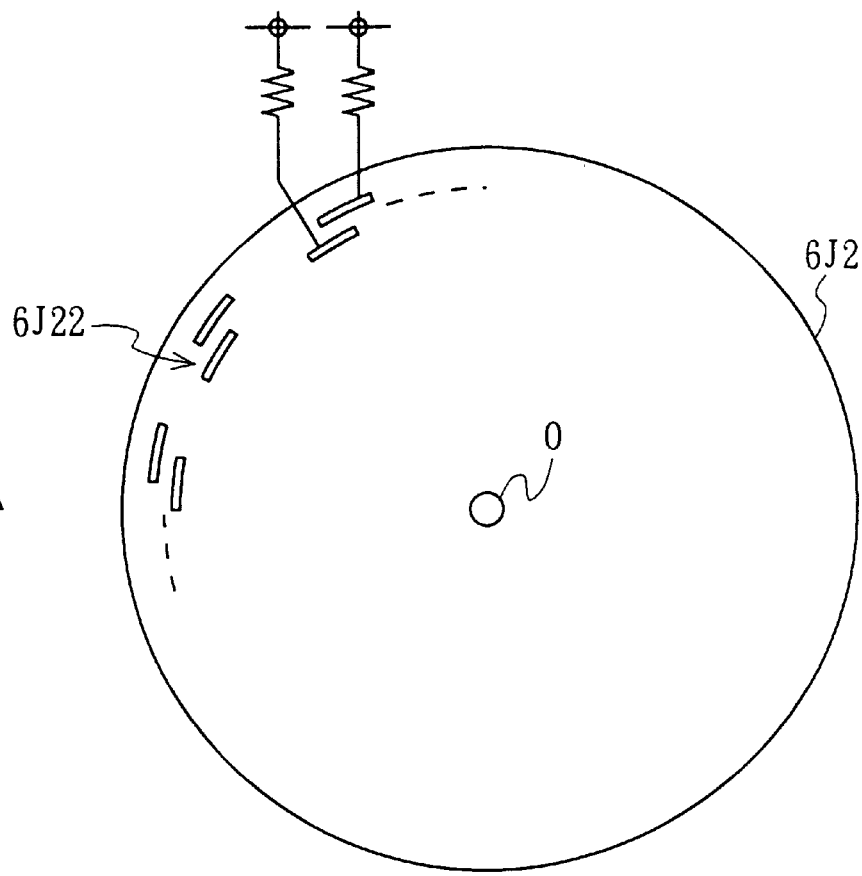
FIGS. 4A and 4B are schematic diagrams showing the construction of a rotary encoder.
Figure 4B:
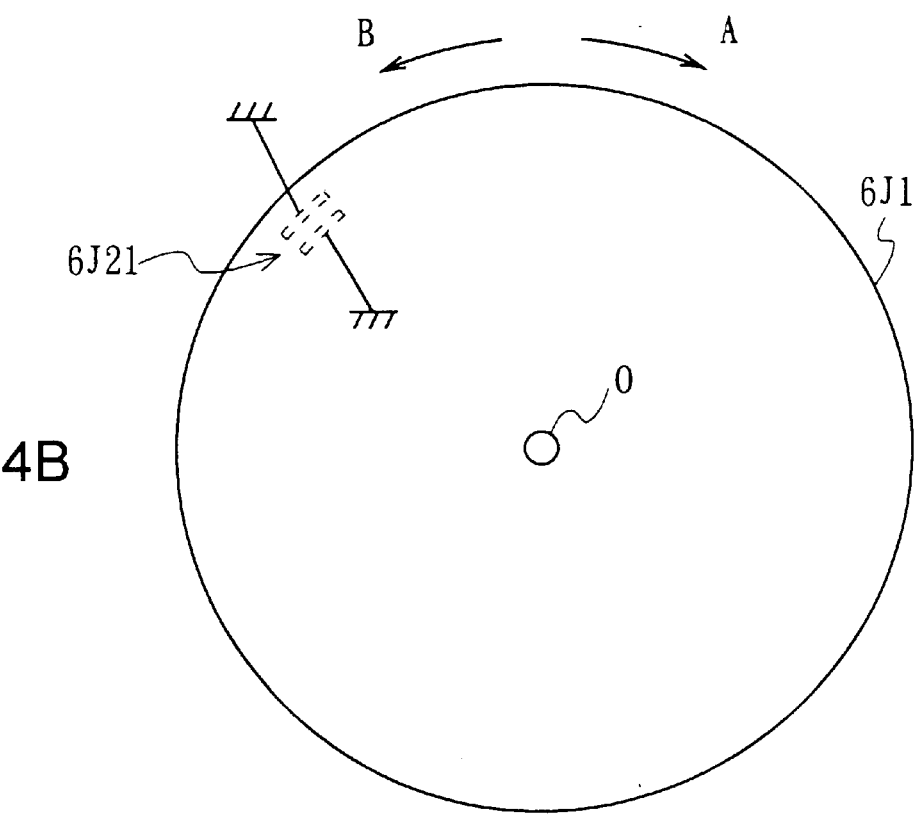

The rotary encoder which slides with the slide board is composed of two discs 6J1 and 6J2 as shown in FIG. 4A and 4B. The disc 6J1 is a movable member layered on the upper surface of the disc 6J2 in, and is attached to the disc 6J2 fixed to the slide board so as to be movable relatively. Here, a pair of opposed electrodes 6J21 is provided on the disc 6J1 on the movable side. When assembled this opposed electrodes 6J21 pair can be connected to twenty pairs of opposed electrodes 6J22 which are provided along the circumference of the disc 6J2. In this connection, the position of the opposed electrodes 6J22 provided on the fixed side of the disc 6J2 are slightly shifted from each other between the inner circumference side and the outer circumference side.

Figure 5A:
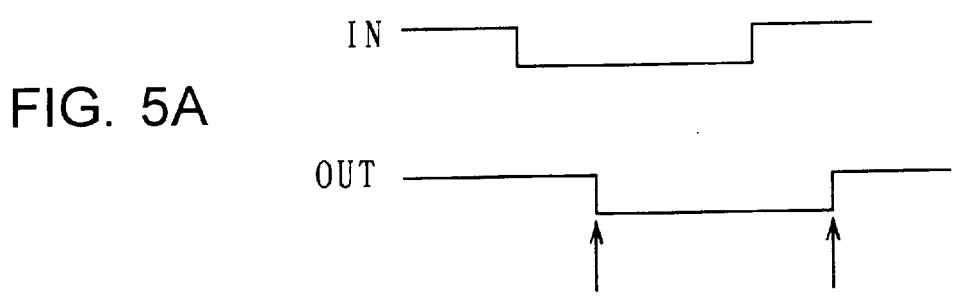
FIGS. 5A and 5B are output waveform diagrams illustrating output waveforms from the rotary encoder.
Figure 5B:
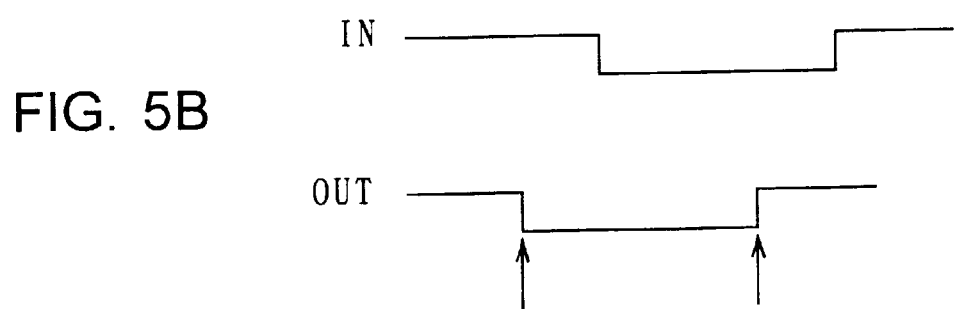

Therefore, if the jog dial 6J is turned in the arrow A direction, the potential outputted from the opposed electrodes 6J22 on the inner circumference side first falls down to the earth potential as shown in FIG. 5A. On the contrary, if the dial 6J is turned in the arrow B direction, the potential on the outer circumference side first falls down to the earth potential as shown in FIG. 5B. In utilizing that, the rotating direction of the jog dial 6J is detected by detecting which of the potential on the inner circumference side or the outer circumference side, first falls down. And the amount of rotation of the jog dial 6J can be detected by counting the number of pulses to be output from the electrodes on the outer circumference side.

A typical operational example using the jog dial 6J will be described. The cursor displayed on the liquid crystal display 5 can be moved upward and downward by turning up and down the jog dial 6J in the circumferential direction in the state where various list screens are displayed on the liquid crystal display 5. In this case, if the jog dial 6J is pushed in the radial direction in this condition (hereinafter, it is referred to as click), an item put the cursor on can be determined and the read out of detailed information concerning the item can be instructed to the CPU.

Furthermore, the volume of receiving tone can be controlled by turning the jog dial 6J in the circumferential direction while talking on the line. Also, it can be muted by clicking the jog dial 6J while the call is in progress.

The portable telephone apparatus 1 is a communication terminal complying with the standard of the GSM system. That is, the user can receive a call waiting service offered in the GSM system freely if the user conducts the fixed operation. The operating method of receiving the call waiting service will be described.

In the portable telephone apparatus 1, if an incoming call arrives while talking with a predetermined call, the screen of the liquid crystal display 5 is automatically switched from the calling screen to the call control screen by triggering the incoming call (hereinafter, it is referred to as trigger). At this time, a list in which all of processings available to the call are listed and itemized is displayed as the call control screen (i.e., a processing item list available to the call is displayed). In the portable telephone apparatus 1, by selecting a desired processing item from the processing item list, a call can be controlled into a connecting state corresponding to the item thus selected. Thereby, in the portable telephone apparatus 1, the connecting state of a call can be certainly and easily controlled by merely selecting the desired item out of processing items displayed on the screen without learning troublesome operating methods in which numerals to be entered differ depending on the call connecting state as the conventional device.

Here, an operating method of call control in the portable telephone apparatus 1 will be concretely described below with reference to diagrams of screen layouts.

In the portable telephone apparatus 1, a screen shown in FIG. 6A is displayed on the liquid crystal display 5 as a calling screen when talking with a predetermined call. More specifically, the telephone number of the other party, "03011223344", and the calling time with the other party, "00:04:33", are displayed. In this condition, if a call arrives from the third party, a call control screen shown in FIG. 6B will be displayed triggering the incoming call.

The telephone number of the other party newly received, "03055667788", is displayed on the first line of the call control screen and processings available to the call arrived are list-displayed on the second to fourth lines of the screen. In this case, the following processings available to the incoming call received can be considered, i.e., a processing to hold the call in progress and connect to the incoming, a processing to disconnect the call in progress and connect with the call received, a processing to disconnect the incoming call received and continue the call now talking, and a processing to include the incoming call received into the call and switch to a tripartite call. However, it is decided here that three processings can be conducted exclusive of the processing to disconnect the call in progress and connect the call received, and these three processing items are list-displayed. In practice, the words "Activate", "Disconnect" and "Multiparty" showing those processings will be displayed on the liquid crystal display 5 as shown in FIG. 6B.

Furthermore, when the call control screen is displayed at first, the cursor showing the item now selected presently (the part where black and white are reversed on the screen, in this figure it is shown by oblique lines) is displayed on the "Activate" in the second line.

At this point, if the jog dial 6J is operated up and down, the cursor showing the item selected can be moved freely upward and downward. For example, if the jog dial 6J is turned down once in the state shown in FIG. 6B, the cursor can be moved to the "Disconnect", one line lower as shown in FIG. 6D. Furthermore, if the jog dial 6J is down operated once in the state shown in FIG. 6D, the cursor can be moved to the "Multi Party" that is one line lower as shown in FIG. 6F. On the other hand, if the jog dial 6J is up operated, the cursor can be moved upward contrary to the above.

When the jog dial 6J is clicked after moving the cursor to the desired processing item by up or down operating the jog dial 6J, in the portable telephone apparatus 1, the processing item is determined and the call control will be executed corresponding to the processing item.

Figure 6C:
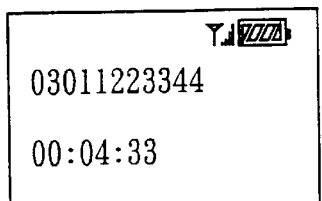
Figure 6C:
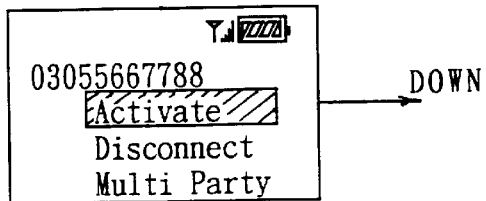
Figure 6C:
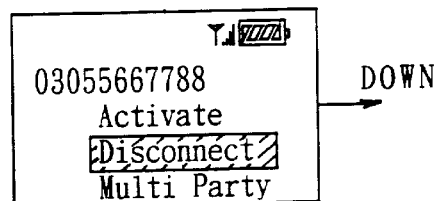
Figure 6C:
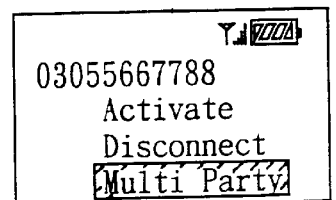
Figure 6C:
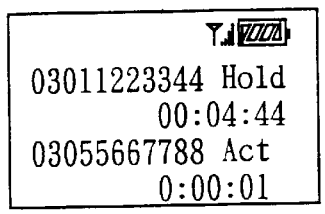

For example, when the jog dial 6J is clicked in the state where the cursor is on the "Activate" as shown in FIG. 6B, the processing for holding the call talking and connecting the incoming call received will be executed (that is, the portable telephone apparatus 1 executes the same processing as that has been executed upon receiving the push operation of the "2" key and the send key in the conventional device, and call-controls by executing a predetermined control process between the base station device (not shown)). In addition to this processing, the screen showing the state of calls obtained by the above processing is displayed on the liquid crystal display 5 as shown in FIG. 6C. More specifically, in the upper part of the screen, the telephone number of the other party talked until now, "03011223344", "Hold" showing that the other party is in a hold state, and the total calling time when the other party has been connected to the present time, "00:04:44", are displayed. Also, in the lower part of the screen, the telephone number of a newly received call, "03055667788", an "Act" showing that the call is in a calling state, and call duration of the call received, "0:00:01" are displayed.

Figure 6E:
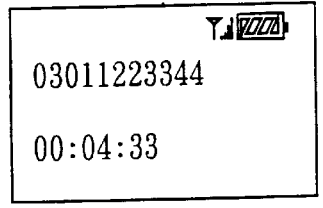

On the other hand, if the jog dial 6J is clicked in the state where the cursor is on the "Disconnect" as shown in FIG. 6D, processing of disconnecting the call received and continuing call with the present call will be executed (that is, the portable telephone apparatus 1 performs the same processing as that has been executed by receiving the push operation of the "1" key and the send key in the conventional device). In addition to this processing, a screen showing the state of the call obtained by the above processing is displayed on the liquid crystal display 5 as shown in FIG. 6E. More specifically, the telephone number of the other party to be continued the call, "03011223344", and the calling time with the other party, "00:04:33", are displayed (that is, a screen like FIG. 6A is displayed) on the screen.

Figure 6G:
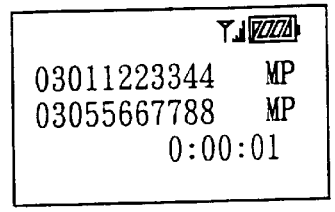

Furthermore, when the jog dial 6J is clicked in the state where the cursor is on the "Multi Party" as shown in FIG. 6F, the processing for including the incoming call received in the conversation and switching into a tripartite call is executed (that is, the portable telephone apparatus 1 performs the same processing as that has been executed upon receiving the push operation of the "3" key and send key in the conventional device). In addition to this processing, a screen showing the state of call obtained by the above processing is displayed on the liquid crystal display 5 as shown in FIG. 6G. More specifically, in the upper part of the screen, the telephone number of the other party talked until now, "03011223344", and "MP" showing that the other party is in the tripartite call. In the lower part of the screen, the telephone number of the incoming call received "03055667788", and "MP" showing that the call is in the tripartite call. Also, in farther lower part, call duration of the tripartite call "0:00:01" is displayed.

In this manner, in this portable telephone apparatus 1, if an incoming call arrives in calling, the screen of the liquid crystal display 5 is automatically switched to the call control screen and processing items available to the newly received call will be list-displayed. As a result, the user can easily call-control by simply selecting the desired processing item out of the processing items for the incoming call received.

Figure 7:
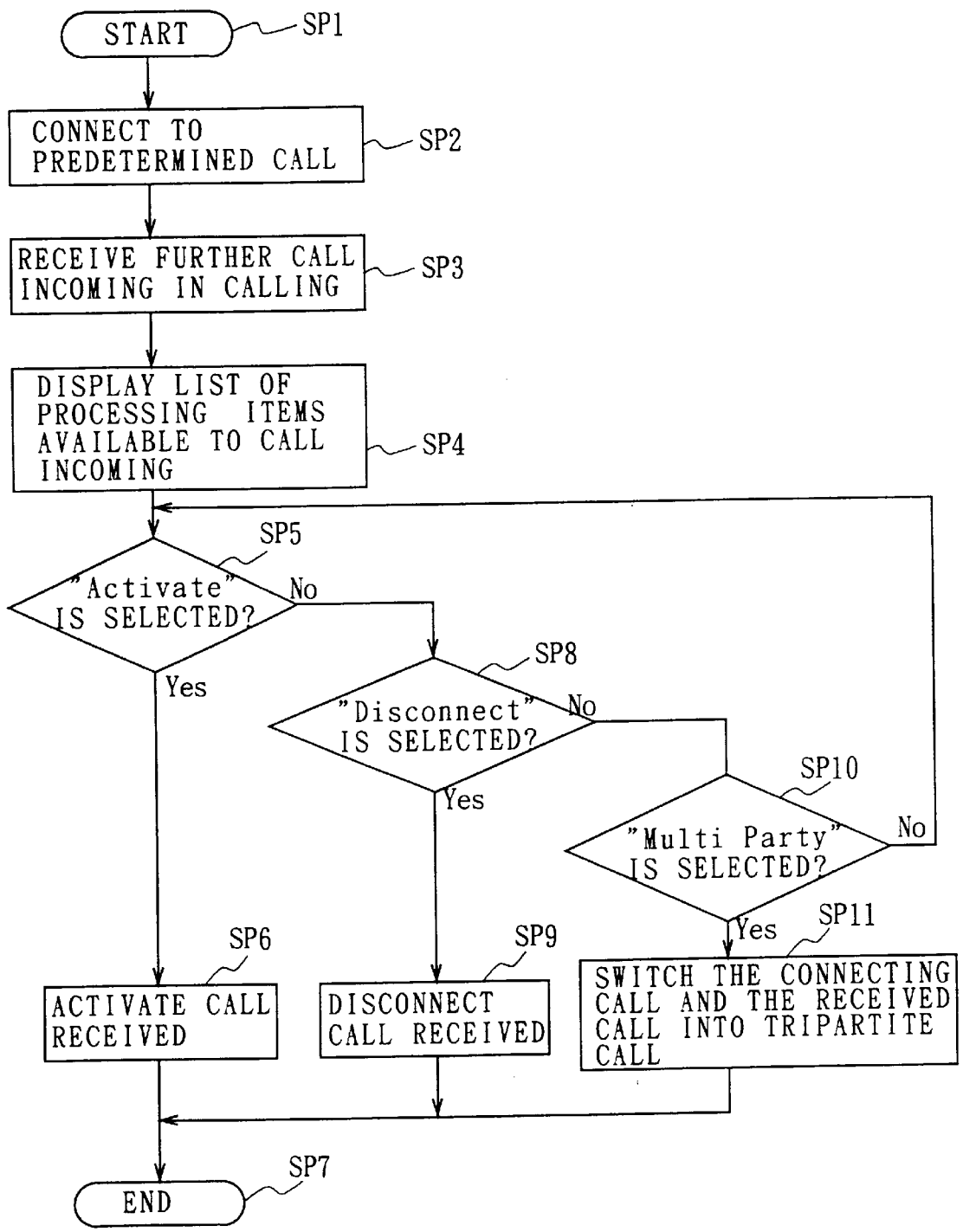
FIG. 7 is a flowchart showing a call control process according to the first embodiment.

Here, displaying the above call control screen will be executed by the display control of the liquid crystal display 5 by the CPU 7, and the processing of the selected processing item will be also executed by the CPU 7. The process at this time will be described below with reference to a flowchart shown in FIG. 7.

Assuming that at the step SP2 entered from the step SP1, a call with the predetermined call is started by a call originating from the portable telephone apparatus 1 or a call incoming to the portable telephone apparatus 1. In this state, at the following step SP3, if a call incoming from the other call arrives, it receives this and proceeds to the following step SP4. At the step SP4, processings available to the call received is list-displayed as a call control screen. And, if there is anything which cannot be processed under this situation, that processing item will be deleted and only the item which can be practically processed will be displayed.

In the following steps, processing items displayed of which item is selected by the user is detected. That is, in step SP5, it is detected whether the "Activate", in which the call in progress is held and the incoming call is connected, is selected or not. In step SP8, it is detected whether the "Disconnect", in which the incoming call is disconnected and the call with the present call is continued, is selected or not. And in step SP10, it is detected whether the "Multi Party", in which the incoming call is included to the present call and it is switched into a tripartite call, is selected or not.

As a result, when it is detected that "Activate" has been selected in step SP5, it proceeds to step SP6 and as well as holding the call in progress and connecting the incoming call received, displays the state of each call on the liquid crystal display 5.

When it is detected that the "Disconnect" has been selected in step SP8, it proceeds to step SP9 and disconnecting the incoming call received continues the call presently connected call and also displays the screen talking on line before the call control screen is displayed on the liquid crystal display 5.

On the other hand, when it is detected that the "Multi Party" has been selected in step SP10, it proceeds to step SP11 to include the incoming call received and the call is switched into a tripartite call and also displays the state of each call on the liquid crystal display 5.

After executing the above processing corresponding to the selected item, it proceeds to step SP7 to terminate the above processing steps.

According to the construction described above, in the portable telephone apparatus 1, if receiving an incoming call arrives in calling, the screen of the liquid crystal display 5 is switched from the calling screen to the call control screen by triggering the call incoming. In this case, processings available to the incoming call are list-displayed itemized as the call control screen. The user moves the cursor on the desired processing item out of the processing items displayed by turning up or down the jog dial 6J and click it while watching the screen. Thereby, the portable telephone apparatus 1 executes call control corresponding to the processing selected by the user.

Accordingly, in the portable telephone apparatus 1, if a call incoming arrives in calling, processings available to the call arrived are displayed on the liquid crystal display 5 in order that the user can select the desired processing out of processing items and executes the call control corresponding to the selected processing. Thereby, the user can control the call by merely selecting the desired processing out of processings displayed on the liquid crystal display 5, and it becomes unnecessary for the user to learn troublesome operating methods in which the numerals to be entered differ depending on the connecting state of the call as the conventional device. Accordingly, in the portable telephone apparatus 1, call control for the call arrived can be certainly and easily performed without learning these troublesome operating methods; thus the usability can be further improved comparing with the conventional apparatus.

Furthermore, in the portable telephone apparatus 1, the processing result after the call control is displayed on the liquid crystal display 5. Accordingly, the user can easily know the situation after the call controlled at a glance.

In this connection, in the case of this embodiment, only the processings available to the incoming call received are displayed as the processing items because there are two calls to be controlled, and if the processing to be conducted to the call received is determined, the processing for the call in calling will be naturally determined. Therefore, in the case of this embodiment, only processing items available to the call arrived are displayed to simplify the operation.

According to the construction described above, if an incoming call arrives in calling, processings available to the incoming call arrived are displayed on the liquid crystal display 5 making the user to select the desired processing out of the processing items and control the call. Thereby, the user can easily and certainly control the call by merely selecting the desired item based on that display.

The first embodiment described above has described the case of displaying only processings for the incoming call received as the call control screen. In the second embodiment, however, processings for the call in progress and the incoming call are arrayed and displayed in a matrix for the user to select. This point will be described more specifically below with reference to screen layouts.

Figure 8A:
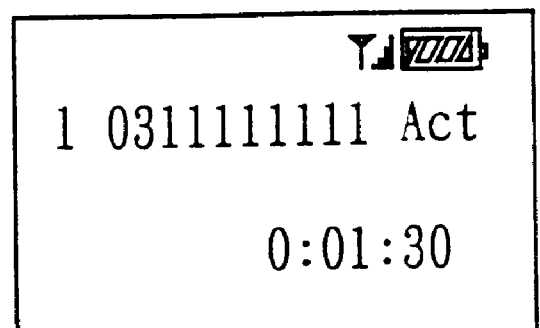
FIGS. 8A to 8D are schematic diagrams showing the screen layout of a call control screen according to the second embodiment.

In the case of this embodient, a screen calling shown in FIG. 8A is displayed on the liquid crystal display 5 when calling with the predetermined call. That is, the telephone number of the other party, "0311111111", "Act" showing that the call is in the calling state, and also the call duration with the other party, "0:01:30" are displayed.

As an identifier for identifying the call, "1" is displayed at the front of the telephone number of the other party. This identifier is also added to the incoming call received later in the order of arrival.

In the case of this embodiment, since the telephone number of the other party, the state of call, and the identifier of the call are displayed on the same line, figures of the telephone number that can be displayed on the line becomes less, and the first ten figures will be de displayed among the actual telephone number.

Figure 8B:
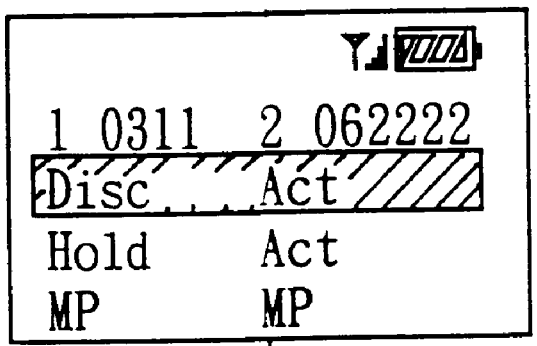

When a call incoming from the third party arrives in this state, a call control screen shown in FIG. 8B is displayed by triggering the call incoming.

As the call control screen, the identifier "1" of the call talking until now and the first four figures of the telephone number of the call, "0311", are displayed on the first half of the first line of the screen, and an identifier of the newly received call, "2", and the first six figures of the telephone number of the call, "062222", are displayed on the latter half of the first line of the screen.

On the screen from the second to fourth lines, combination of processings for each call will be displayed under the heading two call names displayed on the first line. That is, on the second line of the screen, "Disc" is displayed at the lower part of the name of call talking and "Act" is displayed at the lower part of the name of the incoming call arrived, so that the processing to disconnect the call talking and connect the incoming call will be displayed. Furthermore, on the third line of the screen, "Hold" is displayed at the lower position of the name of the call talking and "Act" is displayed at the lower position than the name of the incoming call arrived so that the processing to hold the call in progress and to connect the incoming call will be displayed. And on the fourth line of the screen, by displaying "MP" at the lower position of the name of call talking and also displaying "MP" at the lower position of the name of the incoming call arrived, the processing to include the incoming call arrived to the call and to switch into a tripartite call will be displayed.

Since only three lines are reserved as a display area for displaying the combination of calls, only three processings are displayed on the screen. However, there is the other processing to disconnect the incoming call arrived and continue the call with the call talking, and that processing will be displayed on the screen by turning down the jog dial 6J. In this connection, this processing is shown by displaying "Act" at the lower position of the name of the call talking and "Disc" at the lower position of the name of the incoming call arrived.

Figure 8C:
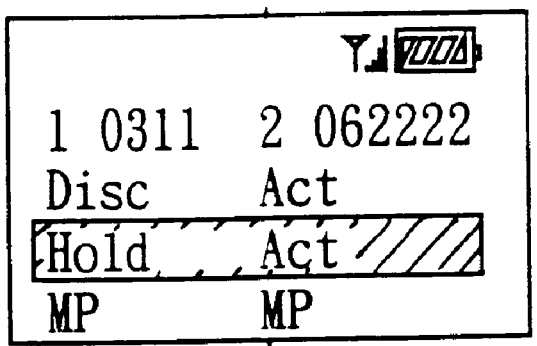
Figure 8D:
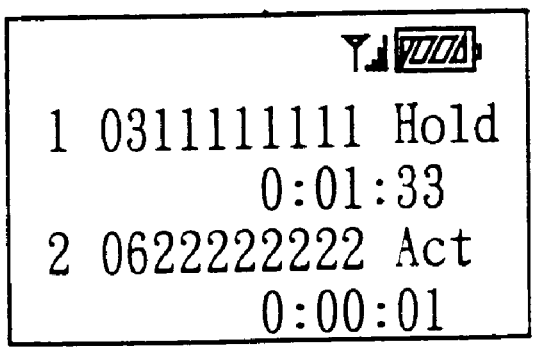

At this point, if the jog dial 6J is clicked after moving the cursor to the desired processing by turning up and down the jog dial 6J, the processing is determined and the call control corresponding to that processing will be executed. For example, if the jog dial 6J is down operated in the state shown in FIG. 8B and clicked after putting the cursor on the line of "Hold" showing the call talking is on "Hold" state and "Act" showing the incoming call arrived is on "Act" state, as shown in FIG. 8C, the processing is determined and the call in progress is held and the incoming call arrived is connected. In addition to the execution of this processing, the screen showing the state of call obtained by the processing is displayed on the screen of the liquid crystal display 5 as shown in FIG. 8D. That is, the identifier of the call in progress until now, "1", its telephone number "0311111111" and "Hold" showing that the call is in a hold state are displayed on the upper part of the screen. And the total calling time when the call has been connected to the present, "0:01:33", is displayed on the following line. Further, the identifier of the incoming call, "2", its telephone number, "0622222222", and "Act" showing that the call is in a calling state are displayed on the lower part of the screen, and call duration of the call, "0:00:01", is displayed in the following line.

Accordingly, in the case of this embodiment, if an incoming call arrives while the call is in progress, the call control screen is displayed on the liquid crystal display 5 by triggering the call incoming. In the case of this embodiment, both names of the call connected until now and the call newly received are displayed and a combination of processings for each call will be displayed under the heading of these call names as the call control screen. The user selects and determines the desired processing out of the processings displayed by operating the jog dial 6J. Thus the processing is executed and the call control is executed. Accordingly, in the case of this embodiment, the user can perform the call control by merely selecting the desired processing out of the processings displayed on the liquid crystal display 5, thus the call control can be easily and certainly performed without learning troublesome operating methods such as the conventional device.

In this connection, in the case of this embodiment, since the processing for the incoming call arrived is not only displayed but also the processing for the call called until now is displayed as the call control screen, how processing will be done for each call can be clearly grasped. Thereby, the usability can be further improved comparing with the first embodiment.

According to the above structure, when the incoming call arrives, both names of the calls, called until now and the call newly received, are displayed and a combination of processings for each call will be displayed under the heading of the call names and make the user to select the desired processing out of the processings and the call will be controlled. Thereby, the user can control the call easily and certainly by merely selecting the desired processing according to the display.

Furthermore, according to the above structure, since the processing for the call in progress is displayed in addition to the processing for the incoming call newly arrived, the call-control can be performed upon clearly grasping the processings to be performed for each call.

The second embodiment described above, has dealt with the case of displaying the processings for the call in progress and the incoming call in a matrix as the call control screen. In the third embodiment, however, processings available to the calls are list-displayed for each call so that these can be shifted by page scrolling. Then, the desired processing is selected out of the processings for each call and the call control corresponding to it will be executed. This point will be described below with reference to screen layout diagrams.

Figure 9A:
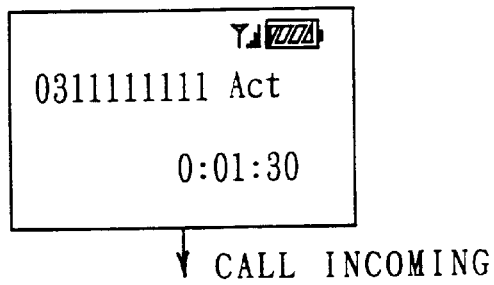
FIGS. 9A to 9F are schematic diagrams showing the screen layout of a call control screen according to the third embodiment.

In the case of this embodiment, when making a call with the predetermined call, a screen is displayed on the liquid crystal display 5 as shown in FIG. 9A. That is, the telephone number of the other party "0311111111", "Act" showing that the call is in progress, and the calling time with the other party, "0:01:30", are displayed.

In this connection, also in the case of this embodiment, the first ten figures of the telephone number will be displayed.

Figure 9B:
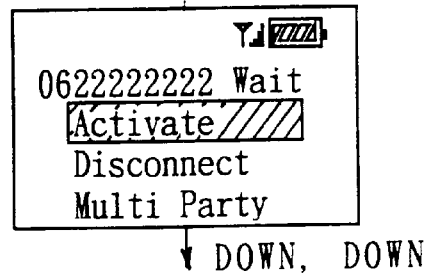

If a call incoming from the third party arrives under this condition, a call control screen shown in FIG. 9B is displayed by triggering the call incoming.

In the case of this embodiment, the call control screen consists of two pages; i.e., the first page shows the processing of the incoming call arrived, and the next page shows the processing of the call in progress. As the call control screen, the first page is displayed first.

In the first page to be displayed at first, the telephone number of the call newly received, "0622222222", and "Wait" showing that the call is waiting to be processed will be displayed on the first line of the screen, as shown in FIG. 9B. And processings for the incoming call newly arrived are list-displayed according to items from the second to fourth lines of the screen: i.e., from the top to downward, "Activate" for connecting the incoming call newly arrived, "Disconnect" for disconnecting the incoming call arrived, and "Multi Party" for including the incoming call newly received to the call are displayed.

Furthermore, a cursor showing the item now selected is displayed on the "Activate" in the second line of the screen.

Figure 9C:
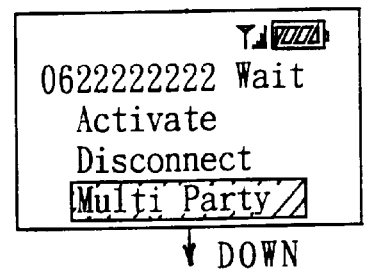
Figure 9D:
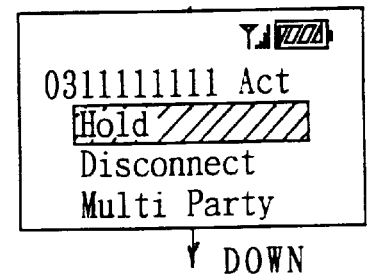

Under this condition, if the jog dial 6J is down operated, the cursor can be gradually moved downward. For example, if the jog dial 6J is down operated twice, the cursor can be moved to "Multi Party" as shown in FIG. 9C. If the jog dial 6J is further down operated in the state where the cursor is at the end of the processing items, the second page of the call control screen is displayed as shown in FIG. 9D as if turning over the pages.

In the second page of the call control screen, the telephone number of the call called until now, "0301111111", and "Act" showing that the call is in the calling state are displayed on the first line of the screen. Furthermore, processings for the call called until now is list-displayed according to items from the second line to fourth line on the screen: i.e., from the top to downward, "Hold" for holding the call talking, "Disconnect" for disconnecting the call talking, "Multi Party" for talking together with the incoming call arrived are displayed.

Figure 9E:
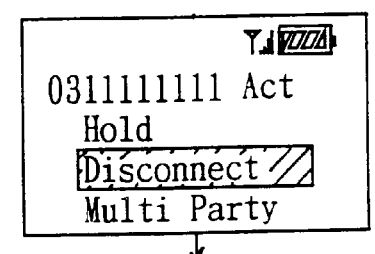

The cursor showing the item selected presently will be displayed on "Hold" in the second line of the screen. If the jog dial 6J is down operated in this state, the cursor can be gradually moved downward. For example, if the jog dial 6J is down operated once, the cursor can be moved to "Disconnect" as shown in FIG. 9E.

If the jog dial 6J is clicked after moving the cursor to the desired processing by operating the jog dial 6J as the above, the processing item will be determined. For example, if the jog dial 6J is clicked in the state where the cursor is on "Disconnect" as shown in FIG. 9E, "Disconnect" will be determined as the processing for the call in progress.

If the processing for one call is determined in this manner, the screen of the liquid crystal display 5 is automatically switched to display the processing for the other call. For example, in the case where "Disconnect" is determined for the call in progress as shown in FIG. 9E, the screen is automatically switched to the screen showing the processing for the incoming call received (i.e., the first page of the call control screen). In this case, it is clear from FIG. 9F that the "Multi Party" is excluded from the processing for the incoming call received; and only "Activate" and "Disconnect" are displayed. This is because "Disconnect" has been selected as the processing for the call in progress, and naturally the processing of "Multi Party" becomes impossible. In the case where the processing for one call is determined and then the processing for the other call is displayed, possible processings only are displayed not displaying the processing which becomes impossible due to the processing determined earlier. Thereby, erroneous operations such that user selects the impossible processing can be prevented.

Figure 9F:
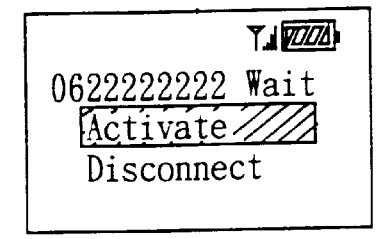

As shown in FIG. 9F, after the screen is switched to the screen showing the processing for the call received, when the cursor is moved to the desired processing item by operating the jog dial 6J and then the jog dial 6J is clicked, the processing is determined as the processing for the incoming call received. Thus, if processings for the call in progress and the incoming call received are selected and determined, the call control corresponding to thus selected and determined processings will be executed. In this connection, it will not be shown in figure in particular here. However, in the case of this embodiment, the screen showing the state of the call is displayed after the call-control has been conducted just as in the case with the first and second embodiment,s described above.

In this manner, in the case of this embodiment, if an incoming call arrives, the call control screen is displayed on the liquid crystal display 5 by triggering the incoming call. As the call control screen, the processing for the incoming call is displayed in the first page, and the processing for the call talking is displayed in the second page, and processings for each call will be list-displayed severally. The user sequentially selects and determines the desired processing out of the processings which are displayed severally for each call by operating the jog dial 6J. Thereby, the processings are executed and the call control is performed. Accordingly, in the case of this embodiment, the user can control the calls by merely selecting the desired processing out of the processings displayed on the liquid crystal display 5, and thus the call control can be easily and certainly executed without learning troublesome operating methods as the conventional device.

Furthermore, in the case of this embodiment, when the processing for the other call is displayed after the processing for one call has been determined, available processings only are displayed without displaying the processing which become impossible due to the processing determined earlier. Thereby, erroneous operations such as that the user selects impossible processing can be prevented.

According to the above structure, in the case of receiving an incoming call, processings for the call in progress and the call newly received are list-displayed for each call and permit the user to be select the desired processing out of processings displayed for each call and the calls will be controlled. Thereby, the user can control the call easily and certainly by merely selecting the desired item in accordance with the displays.

The first to third embodiments described above, have dealt with the case of automatically displaying the call control screen by triggering the incoming call. In this fourth embodiment, however, an operation key called as a call control key is provided on the predetermined position of the main body 2 of the portable telephone apparatus 1 so that the call control screen is displayed when the user operates the call control key. Thereby, the call control screen can be called up by operating the call control key, even after the call has been controlled once, and the call control can be performed at any time. This point will be described in detail below with reference to a screen layout diagram.

Figure 10A:
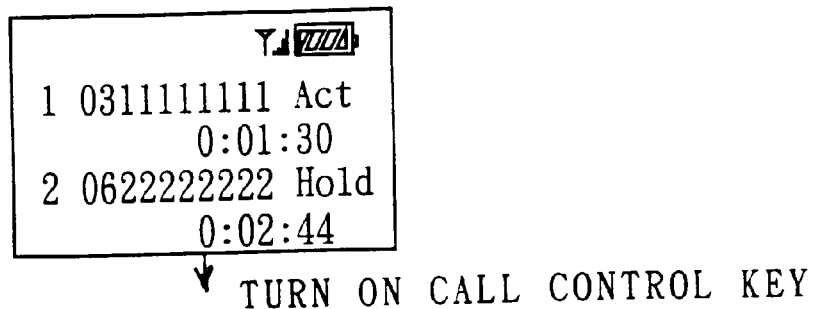
FIGS. 10A to 10D are schematic diagrams showing the screen layout of a call control screen according to the fourth embodiment.

For example, assuming that two calls are received now, one is connected and the other is held. In this case, generally a screen shown in FIG. 10A is displayed on the liquid crystal display 5 as a screen talking. That is, the telephone number of the call with the identifier "1", "0311111111", and "Act" showing that the call is connected are displayed in the first line of the screen. And the total calling time, "0:01:30", is displayed on the following line.

Furthermore, the telephone number of the call having the identifier "2", "0622222222", and "Hold" showing that the call is held are displayed on the third line of the screen. And the total calling time when the call has been connected to the present, "0:02:44", is displayed on the next lower line.

In this connection, also in the case of this embodiment, the first ten figures of the telephone number are displayed.

Figure 10B:
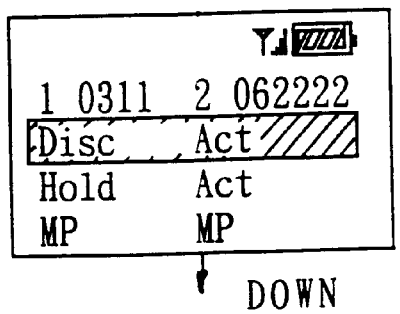

When the call control key is pushed by the user in this state, a call control screen shown in FIG. 10B is displayed. In this case, as in the call control screen, a list in which processings for each call are arranged in a matrix is displayed just as the case with the second embodiment. That is, the identifier of the call called until now, "1", and the first four figures of the telephone number of the call, "0311", are displayed on the first half of the first line of the screen, and the identifier of the waiting call, "2", and the first six figures of the telephone number of the call, "062222", are displayed on the latter half of the first line of the screen.

Moreover, a combination of the processings for each call is displayed under the heading of two calls displayed on the first line from the second to fourth lines of the screen. That is, "Disc" is displayed at the lower part of the name of the call talking and "Act" is displayed at the lower part of the call waiting on the second line so that the processing for disconnecting the call talking and connect the call waiting will be displayed. Also, "Hold" is displayed at the lower part of the name of the call talking and "Act" is displayed at the lower part of the name of the call waiting on the third line so that the processing to hold the call talking and connect the call waiting will be displayed. And "MP" is displayed at the lower part of the name of the call talking and also by displaying "MP" at the lower part of the name of the call waiting on the fourth line the processing to include the call waiting into the call and switch into the tripartite call will be displayed.

Figure 10C:
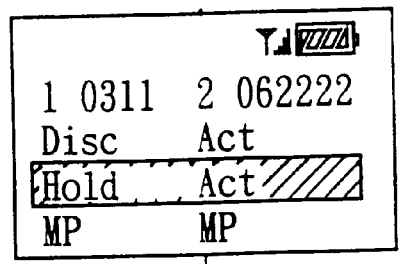

After moving the cursor to the desired processing, if the jog dial 6J is clicked in the state where the call control screen is displayed, the processing is determined and executed. For example, if the click operation is conducted after moving the cursor onto "Hold" on the call talking and "Act" on the call waiting as shown in FIG. 10C, the processing is determined and the call talking is held and the call waiting is connected.

Figure 10D:
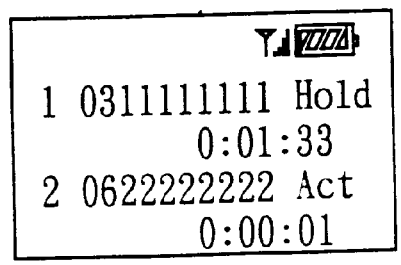

Furthermore, as this processing is conducted, the screen showing the state of call obtained by the processing will be displayed on the screen of the liquid crystal display 5 as shown in FIG. 10D. That is, the identifier "1" of the call called until now, its telephone number, "0311111111", and "Hold" showing that the call is in a hold state are displayed. The total calling time when the call has been connected to the present, "0:01:33", is displayed on the following line. Furthermore, the identifier "2" of the call switched into a call, its telephone number, "0622222222", and "Act" showing that the call is connected are displayed at the lower part of the screen. And the calling time with the call, "0:00:01", is displayed on the further lower line.

Thus, in the case of this emodiment, the call control key is provided so that the call control screen will be displayed when the call control key is operated by the user. Thereby, the call control screen can be called up at any time to perform the call control.

In this connection, the embodiment described above has dealt with the case of calling up the call control screen in case of controlling assuming that two calls exist already. However, the call control screen may be called up by operating the call control key when a call incoming arrives. At this time, if the arrival of incoming call incoming would be displayed on the liquid crystal display 5, the user can operate the call control key by watching the display and can control the call by calling up the call control screen.

According to the above structure, since the call control key is provided and displaying the call control screen, the user selects the desired processing by operating the call control key, the call control screen can be displayed and the user can control the call at any time by simply operating the call control key.

The fourth embodiment described above has dealt with the case of arraying and displaying the processings available to the calls in a matrix when the call control key is operated. In this fifth embodiment, however, processings available to the calls are displayed separately for each call when the call control key is operated. This point will be described specifically below with reference to a screen layout diagram.

Figure 11A:
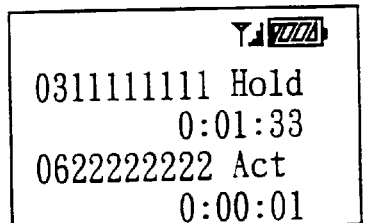
FIGS. 11A to 11F are schematic diagrams showing the screen layout of a call control screen according to the fifth embodiment.

Firstly, also in this embodiment, it is assumed that two calls are received now, one is presently connected and the other is put on hold. In this case, a screen shown in FIG. 11A is displayed on the liquid crystal display 5 as the calling screen. That is, the telephone number of the call waiting, "0311111111", and "Hold" showing that the call is held are displayed on the first line of the screen. Also, the total calling time when the call has been connected to the present time, "0:01:33", is displayed on the following line.

The telephone number of the call talking, "0622222222", and "Act" showing that the call is in a calling state are displayed on the third line of the screen. And the calling time of the call, "0:00:01", is displayed on the further lower line.

In this connection, also in the case of this embodiment, the first ten figures of the telephone number will be displayed.

Figure 11B:
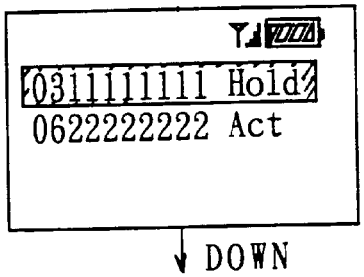

When the call control key is pushed by the user in this state, a call control screen shown in FIG. 11B will be displayed. In this case, two calls presently receiving are displayed at first as the call control screen so that the user selects one of two calls as an object to be controlled. That is, the telephone number of the call waiting, "0311111111", and "Hold" showing that the call is held are displayed on the first line of the screen. The telephone number of the call connected now, "0622222222", and "Act" showing that the call is connected are displayed on the second line. If the jog dial 6J is up or down operated in the state where two calls are displayed, the cursor can be moved onto the desired call. For example, if the jog dial 6J is down operated once, the cursor can be moved onto the call presently talking.

Figure 11C:
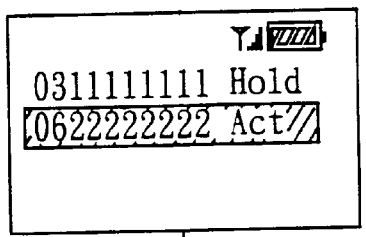
Figure 11D:
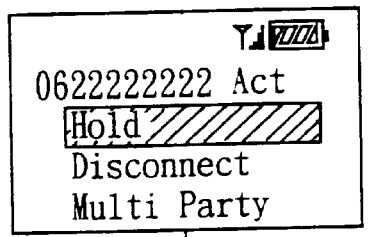

Thus, when the jog dial 6J is clicked by moving the cursor to the desired call, the call is determined and processing items for the call are list-displayed. For example, if click operation is conducted by moving the cursor to the call connected now as shown in FIG. 11C, the call connected is determined and processing items for that call are displayed as shown in FIG. 11D. As it is apparent from this FIG. 11D, the telephone number of the call determined as the control object, "0622222222", and "Act" showing that the call is connected are displayed on the first line of the screen, and processings available to the call are list-displayed from the second to fourth lines of the screen. That is, "Hold" to hold the call talking is displayed on the second line of the screen, "Disconnect" for disconnecting the call talking is displayed on the third line of the screen, and "Multi Party" to include the call waiting to the connecting call in progress is displayed on the fourth line.

Figure 11E:
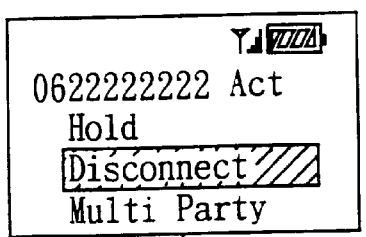
Figure 11F:
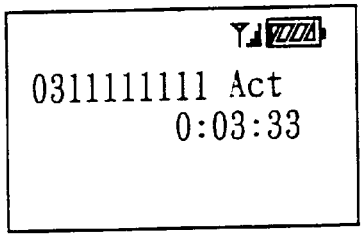

If the jog dial 6J is up or down operated in the state where each processing is displayed, the cursor can be moved to the desired processing. For example, if the jog dial 6J is down operated once, the cursor can be moved to "Disconnect" as shown in FIG. 11E. If the jog dial 6J is clicked after moving the cursor to the desired processing as described above, the processing is determined and executed. For example as shown in FIG. 11E, if the jog dial 6J is clicked by moving the cursor to the "Disconnect", "Disconnect" is determined and executed. Thus, the call in progress is disconnected and the call waiting is switched into the connecting state. Furthermore, with this processing, the state of call obtained by the processing is displayed on the screen as shown in FIG. 11F. That is, the telephone number of the call remained, "0311111111", and "Act" showing that the call is connected are displayed on the screen. Furthermore, the total calling time when the call has been connected to the present, "0:03:33", is displayed on the following line.

Thus, in this embodiment, the call control key is provided in order that on the call control screen the processings available to the call are separately displayed for each call and make the user to select the desired processing when the call control key is operated by the user. Thus, also in this case, the call control screen can be called up any time and call control can be executed.

In this connection, the embodiment described here has dealt with the case of calling up the control screen when call-controlling these calls assuming that two calls exist already. However, the call control screen can be called up by operating the call control key if call incoming arrives. At this time, if the arrival of incoming call is displayed on the liquid crystal display 5, the user can operate the call control key by watching the display and can control the call by calling up the call control screen.

According to the above structure, the call control key is provided and processings available to each call are separately displayed on the call control screen and permit the user to select the described processing by the user if the call control key is operated by the user, thereby, the call control screen can be displayed and call control can be performed at any time provided that the user operate the call control key.

Note that, in the fifth embodiment described above, the other call is automatically connected when "Disconnect" is selected for one call, however, the present invention is not limited thereto and the processing of the other call can be also selected by the user after selecting the processing of one call as the third embodiment. More specifically, as the third embodiment, the desired processing can be selected by the user by displaying processings available to the call for each call.

In this connection, in the case where the proccessings available to the call are displayed for each call, two methods can be considered, one method is to return the screen to the normal calling screen after the processing to be executed for one call is determined; the other method is after the processing for one call is determined, processings available to the other call will be list-displayed on the screen in order to select the processing to be executed for the other call. In this case, either of of methods can be utilized.

Further, in the fourth and fifth embodiments, the call control screen is displayed when the call control key is operated, however, the present invention is not limited thereto and the call control screen can be displayed when a menu key is operated. In short, the same effects as those of the above cases can be obtained by displaying the call control screen when the predetermined operation key is operated by the user.

Further, in the aforementioned embodiments, two calls of control objects have been received, however, the present invention is not limited thereto and the same effects as those of the above cases can be obtained by displaying the call control screen such as the above, and make the user to select the desired processing even if three or four calls to be controlled are received. In short, the number of calls to be controlled is not limited in this invention.

However, in the case where the number of calls is increased, it is considered that it is desirable to list-display processings available to the call for each call rather than arraying and displaying in a matrix. This is because if the horizontally wide liquid crystal display 5 is used it can coped with the case where the number of calls is increased even in matrix display, however, in the portable telephone apparatus 1, the size of the liquid crystal display 5 is restricted and the size cannot be often enlarged.

Further, in the aforementioned embodiments, a call is shown by displaying the telephone number of the call, however, the present invention is not limited thereto and if the call is originated from the telephone list, the name of the other party is apparent, thus the call can be shown by utilizing that.

Further, in the aforementioned embodiments, the call control screen is displayed by triggering the incoming call or the call control screen is displayed in response to the operation of the call control key, however, the present invention is not limited thereto and the call control screen can be displayed always in the case where the predetermined call is connected. Thus, call control can be performed at any time without operating the call control key.

Further, in the aforementioned embodiments, processings available to the call are list-displayed, or arranged and displayed in a matrix, however, the present invention is not limited thereto and the processings available to the call can be displayed with the other method. In short, the same effects as these of the above case can be obtained by displaying the processings available to the call and permitting the user to select the desired processing and executing the call control corresponding to the processing thus selected.

Further, the aforementioned embodiments, the jog dial 6J is used as a means of selecting and determining the processing item displayed, however, the present invention is not limited thereto and the other input means can be used provided that the input means is capable of inputting a direction and amount of movement for moving the cursor in the predetermined direction and the determination information for determining the item on which the cursor is displayed.

For example, a jog shuttle equipped with a clicking function in which an angle of rotation is restricted to a predetermined angle, a track ball with a clicking function, or a joy stick with a clicking function can be used.

Further, in the aforementioned embodiments, the display control on the liquid crystal display 5 and the call control corresponding to the selected processing item are conducted by the CPU 7, however, the present invention is not limited thereto and the same effects as those of the above can be obtained by providing the control means for controlling the call into a connecting state corresponding to the processing item selected and determined by the user's operation as well as displaying processing items available to the call on display means.

Furthermore, in the aforementioned embodiments, the present invention is applied to the portable telephone apparatus of the GSM system, however, the present invention is not limited thereto and the present invention can be widely applied to the other communication terminal device in which the connecting state of a call can be controlled into the desired connecting state by a predetermined operation.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication terminal device for controlling a connecting state of a call into a desired connecting state upon a predetermined operation by a user, comprising:

display means for displaying processing items available to the user relative to a call;

input means for selecting and determining a desired processing item out of said processing items displayed on said display means; and control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user.

2. The communication terminal device according to claim 1, wherein said control means controls said display means to display said processing items on said display means when an incoming call is received.

3. The communication terminal device according to claim 2, wherein said control means controls said display means to display a list of said processing items available to the user on said display means for each call.

4. The communication terminal device according to claim 3, wherein when a processing for one call is determined by the user and a processing for another call is naturally determined, said control means controls said display means to display a list of only processing items available to the user relative to said one call on said display means.

5. The communication terminal device according to claim 3, wherein determining the processing for said one call, said control means controls said display means to display a list of only processings practically available as said processing items of said another call by excluding the unavailable processing from the list.

6. The communication terminal device according to claim 2, wherein said control means controls said display means to display a combination of processings for each call on said display means as said processing items.

7. The communication terminal device according to claim 1, wherein said control means controls said display means to display a list of said processing items available to the user on said display means for each call.

8. The communication terminal device according to claim 7, wherein when a processing for one call is determined by the user and a processing for another call is naturally determined, said control means controls said display means to display a list of only processing items available to the user relative to said one call on said display means.

9. The communication terminal device according to claim 7, wherein if a processing available to said other calls generated by said input means determining the processing for said one call, said control means controls said display means to display a list of only processings practically available as said processing items of said another call by excluding the unavailable processing.

10. The communication terminal device according to claim 1, wherein said control means controls said display means to display a combination of processings for each call on said display means as said processing items.

11. The communication terminal device according to claim 1, wherein said control means always controls said display means to display said processing items on said display means during a time when a predetermined call is connected.

12. The communication terminal device according to claim 11, wherein said control means controls said display means to display a list of said processing items available to the user on said display means for each call.

13. The communication terminal device according to claim 12, wherein when a processing for one call is determined by the user and a processing for the other call is naturally determined, said control means controls said display means to display a list of only processing items available to the user relative to said one call on said display means.

14. The communication terminal device according to claim 12, wherein if a processing unavailable to said other call is generated by said input means determining the processing for said one call, said control means controls said display means to display a list of only processings practically available as said processing items of said another call by excluding the unavailable processing.

15. The communication terminal device according to claim 11, wherein said control means controls said display means to display a combination of processings for each call on said display means as said processing items.

16. The communication terminal device according to claim 1, wherein:

said display means displays a cursor showing the processing item selected by the user; and said input means includes means for controlling a direction and amount of movement of said cursor in a predetermined direction and includes determining information for determining that the processing item where said cursor is displayed can be entered by the user.

17. A communicating method for controlling a connecting state of a call into a desired connecting state upon a predetermined operation by a user, comprising the steps of:

displaying processing items available to the user relative to the call on a display;

selecting and determining a desired processing item out of said processing items displayed on said display by the user operating an input unit; and controlling the processing items being displayed on said display and controlling the call into a connecting state corresponding to the processing item selected and determined by the operation of said input unit by the user, wherein said step of controlling the processing items includes displaying said processing items on said display when a predetermined selection operation is made by the user.

18. The communication method according to claim 17, wherein said step of controlling said processing items on said display includes displaying said processing items on said display when a predetermined call is received.

19. The communicating method according to claim 18, wherein said step of controlling the processing items includes listing said processing items available to the call on said display for each call.

20. The communicating method according to claim 19, wherein in the case where a processing for one call is determined by the user and a processing for another call is naturally determined, said step of controlling the processing items includes listing only processing items available to said one call on said display.

21. The communicating method according to claim 19, wherein if a processing unavailable to the another call is generated by determining the processing for said one call, said step of controlling the processing items includes listing only processings practically available as said processing items of said other call by excluding the unavailable processing from the listing.

22. The communicating method according to claim 18, wherein said steps of controlling the processing items includes displaying a combination of processings for each call on said display as said processing items.

23. The communicating method according to claim 17, wherein said step of controlling the processing items includes listing said processing items available to the call on said display for each call.

24. The communicating method according to claim 23, wherein when a processing for one call is determined by said step of selecting and a processing for another call is naturally determined, said step of controlling said processing items includes listing only processing items available to said one call on said display.

25. The communicating method according to claim 23, wherein if a processing unavailable to said other call is selected by determining the processing for said one call, said step of controlling said processing items includes listing only processings available as said processing items of said another call by excluding the unavailable processing items.

26. The communicating method according to claim 17, wherein said step of controlling said processing items includes displaying a combination of processings for each call on said display means as said processing items.

27. The communicating method according to claim 17, wherein said step of controlling the display of said processing items includes always displaying said processing items on said display during a time when a predetermined call is connected.

28. The communicating method according to claim 27, wherein said step of controlling the display of said processing items includes listing said processing items available to the user on said display for each call.

29. The communicating method according to claim 28, wherein in the case where a processing for one call is determined by said step of selecting and a processing for another call is naturally determined, said step of controlling the display of said processing items includes listing only processing items available to said one call on said display.

30. The communicating method according to claim 28, wherein if a processing unavailable to said another call is generated by said step of selecting and determining the processing for said one call, said step of controlling the display of said processing items includes listing only processings available as said processing items of said another call by excluding the unavailable processing items.

31. The communicating method according to claim 27, wherein said step of controlling the display of said processing items includes displaying a combination of processings for each call on said display as said processing items.

32. The communicating method according to claim 17, wherein:

said step of displaying includes displaying a cursor showing the processing item selected in said step of selecting;

determining a direction and amount of movement for moving said cursor in a predetermined direction; and determining information for determining the processing item on which said cursor is displayed can be selected by the user.

* * * * *

(12) EX PARTE REEXAMINATION CERTIFICATE (8879th)
United States Patent
Sudo

(10) Number: US 6,070,068 C1
(45) Certificate Issued: Mar. 6, 2012

(54) COMMUNICATION TERMINAL DEVICE AND METHOD FOR CONTROLLING A CONNECTING STATE OF A CALL INTO A DESIRED CONNECTION STATE UPON A PREDETERMINED OPERATION BY A USER

(75) Inventor: Fukuharu Sudo, Tokyo (JP)

(73) Assignee: Mobilemedia Ideas LLC, Chevy Chase, MD (US)

Reexamination Request:
No. 90/011,655, Apr. 20, 2011

Reexamination Certificate for:
Patent No.: 6,070,068
Issued: May 30, 2000
Appl. No.: 08/818,564
Filed: Mar. 14, 1997

(30) Foreign Application Priority Data

Mar. 19, 1996 (JP) .............................................. 8-090079

(51) Int. Cl.
*H04Q 7/32* (2006.01)

(52) U.S. Cl. ................................. 455/414.1; 379/142.17
(58) Field of Classification Search ........................ None
See application file for complete search history.

(56) References Cited

To view the complete listing of prior art documents cited during the proceeding for Reexamination Control Number 90/011,655, please refer to the USPTO's public Patent Application Information Retrieval (PAIR) system under the Display References tab.

*Primary Examiner* — Andrew Nalven

(57) ABSTRACT

In a communication terminal device, the connecting state of a call can certainly and easily be controlled without learning troublesome operating methods which are different depending on the connecting state of a call by providing controller for displaying processing items available to a call a display and controlling the call into the connecting state corresponding to the processing item which is selected and determined by the user's operation of an input unit, the user can control the connecting state of the call by merely selecting the desired processing item.

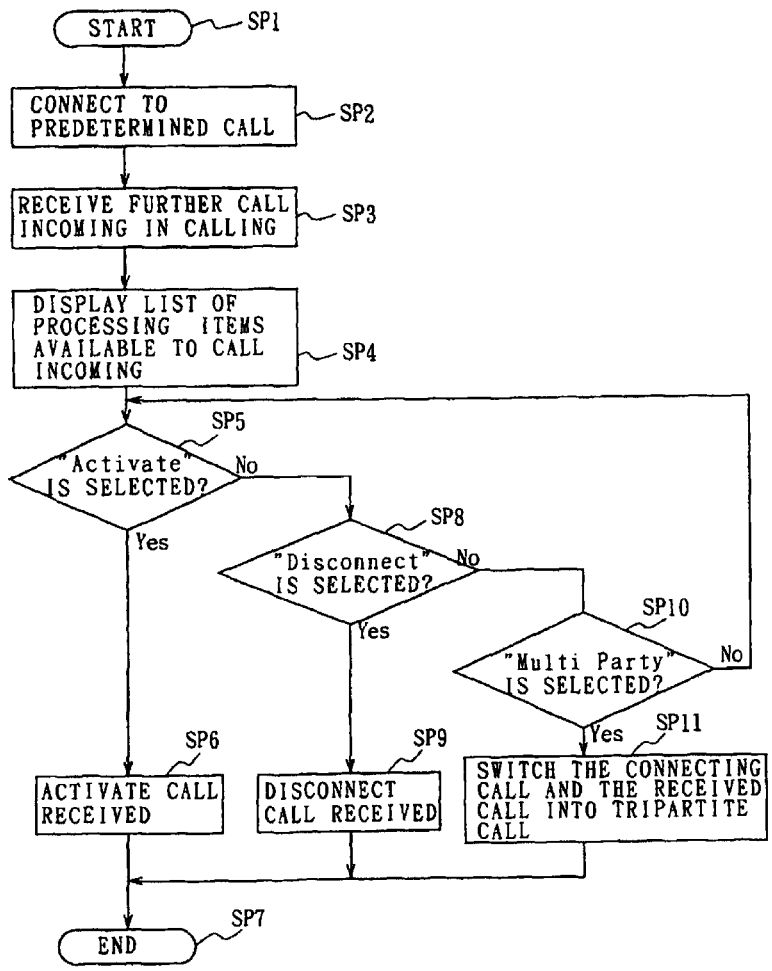

US 6,070,068 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17-22 and 27-32 are cancelled.

Claims 1, 4, 6, 8, 10, 13, 15, 23, 24 and 26 are determined to be patentable as amended.

Claims 2, 3, 5, 7, 9, 11, 12, 14, 16 and 25, dependent on an amended claim, are determined to be patentable.

New claims 33-57 are added and determined to be patentable.

1. A communication terminal device for controlling a connecting state of a call into a desired connecting state upon a predetermined operation by a user, comprising:
   display means for displaying processing items available to the user relative to a call;
   input means for selecting and determining a desired processing item out of said processing items displayed on said display means; and
   control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when *only* a *single* predetermined operation key of said input means is pushed by the user.

4. [The communication terminal device according to claim 3,] *A communication terminal device for controlling a connecting state of a call into a desired connecting state upon a predetermined operation by a user, comprising:*
   *display means for displaying processing items available to the user relative to a call;*
   *input means for selecting and determining a desired processing item out of said processing items displayed on said display means; and*
   *control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user,*
   *wherein said control means controls said display means to display said processing items on said display means when an incoming call is received,*
   *wherein said control means controls said display means to display a list of said processing items available to the user on said display means for each call, and*
   *wherein when a processing for one call is determined by the user and a processing for another call is naturally determined, said control means controls said display means to display a list of only processing items available to the user relative to said one call on said display means.*

6. [The communication terminal device according to claim 2.] *A communication terminal device for controlling a connecting state of a call into a desired connecting state upon a predetermined operation by a user, comprising:*
   *display means for displaying processing items available to the user relative to a call;*
   *input means for selecting and determining a desired processing item out of said processing items displayed on said display means; and*
   *control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user,*
   *wherein said control means controls said display means to display said processing items on said display means when an incoming call is received, and*
   *wherein said control means controls said display means to display a combination of processings for each call on said display means as said processing items.*

8. [The communication terminal device according to claim 7.] *A communication terminal device for controlling a connecting state of a call into a desired connecting state upon a predetermined operation by a user, comprising:*
   *display means for displaying processing items available to the user relative to a call;*
   *input means for selecting and determining a desired processing item out of said processing items displayed on said display means; and*
   *control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user,*
   *wherein said control means controls said display means to display a list of said processing items available to the user on said display means for each call, and*
   *wherein when a processing for one call is determined by the user and a processing for another call is naturally determined, said control means controls said display means to display a list of only processing items available to the user relative to said one call on said display means.*

10. [The communication terminal device according to claim 1.] *A communication terminal device for controlling a* connecting state of a call into a desired connecting state upon a predetermined operation by a user, comprising:

display means for displaying processing items available to the user relative to a call;

input means for selecting and determining a desired processing item out of said processing items displayed on said display means; and control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user, wherein said control means controls said display means to display a combination of processings for each call on said display means as said processing items.

13. [The communication terminal device according to claim 12] *A communication terminal device for controlling a connecting state of a call into a desired connecting state upon a predetermined operation by a user, comprising:*

*display means for displaying processing items available to the user relative to a call;*

*input means for selecting and determining a desired processing item out of said processing items displayed on said display means; and*

*control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user,*

*wherein said control means always controls said display means to display said processing items on said display means during a time when a predetermined call is connected,* wherein said control means controls said display means to display a list of said processing items available to the user on said display means for each call, and wherein when a processing for one call is determined by the user and a processing for the other call is naturally determined, said control means controls said display means to display a list of only processing items available to the user relative to said one call on said display means.

15. [The communication terminal device according to claim 11,] *A communication terminal device for controlling a connecting state of a call into a desired connecting state upon a predetermined operation by a user, comprising:*

*display means for displaying processing items availble to the user relative to a call;*

*input means for selecting and determining a desired processing item out of said processing items displayed on said display means; and*

*control means for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when a predetermined operation key of said input means is pushed by the user,* wherein said control means always controls said display means to display said processing items on said display means during a time when a predetermined call is connected, wherein said control means controls said display means to display a combination of processings for each call on said display means as said processing items.

23. [The communicating method according to claim 17] *A communicating method for controlling a connecting state of a call into a desired connecting state upon a predetermined operation by a user, comprising the steps of:*

*displaying processing items available to the user relative to the call on a display;*

*selecting and determining a desired processing item out of said processing items displayed on said display by the user operating an input unit; and*

*controlling the processing items being displayed on said display and controlling the call into a connecting state corresponding to the processing item selected and determined by the operation of said input unit by the user, wherein said step of controlling the processing items includes displaying said processing items on said display when only a single predetermined selection operation is made by the user,* wherein said step of controlling the processing items includes listing said processing items available to the call on said display for each call.

24. [The communicating method according to claim 23,] *A communicating method for controlling a connecting state of a call into a desired connecting state upon a predetermined operation by a user, comprising the steps of:*

*displaying processing items available to the user relative to the call on a display;*

*selecting and determining a desired processing item out of said processing items displayed on said display by the user operating an input unit; and*

*controlling the processing items being displayed on said display and controlling the call into a connecting state corresponding to the processing item selected and determined by the operation of said input unit by the user, wherein said step of controlling the processing items includes displaying said processing items on said display when a predetermined selection operation is made by the user, wherein said step of controlling the processing items includes listing said processing items available to the call on said display for each call,* wherein when a processing for one call is determined by said step of selecting and a processing for another call is naturally determined, said step of controlling said processing items includes listing only processing items available to said one call on said display.

26. [The communicating method according to claim 17] *A communicating method for controlling a connecting state of a call into a desired connecting state upon a predetermined operation by a user, comprising the steps of:*

*displaying processing items available to the user relative to the call on a display;* selecting and determining a desired processing item out of said processing items displayed on said display by the user operating an input unit; and controlling the processing items being displayed on said display and controlling the call into a connecting state corresponding to the processing item selected and determined by the operation of said input unit by the user, *wherein said step of controlling the processing items includes displaying said processing items on said display when a predetermined selection operation is made by the user,* wherein said step of controlling said processing items includes displaying a combination of processings for each call on said display means as said processing items.

*33. A communication terminal device for controlling a connecting state of a call into a desired connecting state upon a predetermined operation by a user, comprising:*

*display means for displaying processing items available to the user relative to a call;*

*input means for selecting and determining a desired processing item out of said processing items displayed on said display means; and*

*control means for controlling displaying of the processing items available to the user relative to a present call and to an incoming call on said display means and controlling the present call and the incoming call into a respective connecting state corresponding to the processing item selected and determined by the operation of said input means by a user,*

*wherein said control means has a first operating state in which said control means controls said display means to display a status of at least one call, and*

*wherein, in response to a predetermined operation key of said input means being pushed by the user while said control means is in the first operating state, said control means controls said display means to display said processing items on said display means.*

*34. The communication terminal device according to claim 33, wherein said control means controls said display means to display said processing items on said display means when an incoming call is received.*

*35. The communication terminal device according to claim 34, wherein said control means controls said display means to display a list of said processing items available to the user on said display means for each call.*

*36. The communication terminal device according to claim 35, wherein when a processing for one call is determined by the user and a processing for another call is naturally determined, said control means controls said display means to display a list of only processing items available to the user relative to said one call on said display means.*

*37. The communication terminal device according to claim 35, wherein determining the processing for said one call, said control means controls said display means to display a list of only processings practically available as said processing items of said another call by excluding the unavailable processing from the list.*

*38. The communication terminal device according to claim 34, wherein said control means controls said display means to display a combination of processings for each call on said display means as said processing items.*

*39. The communication terminal device according to claim 33, wherein said control means controls said display means to display a list of said processing items available to the user on said display means for each call.*

*40. The communication terminal device according to claim 39, wherein when a processing for one call is determined by the user and a processing for another call is naturally determined, said control means controls said display means to display a list of only processing items available to the user relative to said one call on said display means.*

*41. The communication terminal device according to claim 39, wherein if a processing available to said other calls generated by said input means determining the processing for said one call, said control means controls said display means to display a list of only processings practically available as said processing items of said another call by excluding the unavailable processing.*

*42. The communication terminal device according to claim 33, wherein said control means controls said display means to display a combination of processings for each call on said display means as said processing items.*

*43. The communication terminal device according to claim 33, wherein said control means always controls said display means to display said processing items on said display means during a time when a predetermined call is connected.*

*44. The communication terminal device according to claim 43, wherein said control means controls said display means to display a list of said processing items available to the user on said display means for each call.*

*45. The communication terminal device according to claim 44, wherein when a processing for one call is determined by the user and a processing for the other call is naturally determined, said control means controls said display means to display a list of only processing items available to the user relative to said one call on said display means.*

*46. The communication terminal device according to claim 44, wherein if a processing unavailable to said other call is generated by said input means determining the processing for said one call, said control means controls said display means to display a list of only processings practically available as said processing items of said another call by excluding the unavailable processing.*

*47. The communication terminal device according to claim 43, wherein said control means controls said display means to display a combination of processings for each call on said display means as said processing items.*

*48. The communication terminal device according to claim 33, wherein:*

*said display means displays a cursor showing the processing item selected by the user; and*

*said input means includes means for controlling a direction and amount of movement of said cursor in a predetermined direction and includes determining information for determining that the processing item where said cursor is displayed can be entered by the user.*

*49. A portable telephone apparatus for controlling a connecting state of a call into a desired connecting state upon a predetermined operation by a user, comprising:*

*a body;*

*an antenna;*

*a transmitting/receiving circuit provided in the body of the portable telephone apparatus that transmits signals to and receives signals from a base station via the antenna;*

*display means, provided in the body of the portable telephone apparatus, for displaying processing items available to the user relative to a call;*

*input means, provided in the body of the portable telephone apparatus, for selecting and determining a desired processing item out of said processing items displayed on said display means; and* control means, provided in the body of the portable telephone apparatus, for controlling displaying of the processing items available to the user relative to a present call and to an incoming call on said display means and controlling the present call and the incoming call into a respective connecting state corresponding to the processing item selected and determined by the operation of said input means by a user, wherein said control means controls said display means to display said processing items on said display means when only a single predetermined operation key of said input means is pushed by the user.

50. The portable telephone apparatus according to claim 49, wherein said control means provide a lock and unlock function of said input means to prevent an erroneous operation when the portable telephone apparatus is put in a pocket or a bag.

51. The portable telephone apparatus according to claim 50, wherein said lock and unlock function is for a key lock function.

52. The portable telephone apparatus according to claim 49, wherein said input means comprises at least ten numeral keys that can be used to input letters in addition to numerals by pressing a given key once to select a first letter, twice to select a second letter, and three times to select a third letter.

53. The portable telephone apparatus according to claim 52, wherein said numeral keys are used for selecting a display item while a telephone number list is displayed.

54. The portable telephone apparatus according to claim 49, wherein said control means controls a font size on the display means automatically.

55. The portable telephone apparatus according to claim 49, wherein said control means provides functions of recording a conversation and subsequently playing back the recorded conversation.

56. The portable telephone apparatus according to claim 49, wherein said input means include a send key for sending a call for an entered number and also for calling up past dial records.

57. The portable telephone apparatus according to claim 49, wherein said input means is capable of inputting a direction and amount of movement as user input.

* * * * *

(12) EX PARTE REEXAMINATION CERTIFICATE (9882nd)
United States Patent
Sudo

(10) Number: US 6,070,068 C2
(45) Certificate Issued: Oct. 17, 2013

(54) COMMUNICATION TERMINAL DEVICE AND METHOD FOR CONTROLLING A CONNECTING STATE OF A CALL INTO A DESIRED CONNECTION STATE UPON A PREDETERMINED OPERATION BY A USER

(75) Inventor: Fukuharu Sudo, Tokyo (JP)

(73) Assignee: Mobilemedia Ideas LLC, Chevy Chase, MD (US)

Reexamination Request:
No. 90/012,780, Jan. 31, 2013

Reexamination Certificate for:
Patent No.: 6,070,068
Issued: May 30, 2000
Appl. No.: 08/818,564
Filed: Mar. 14, 1997

Reexamination Certificate C1 6,070,068 issued Mar. 6, 2012

(30) Foreign Application Priority Data

Mar. 19, 1996 (JP) .................. 8-090079

(51) Int. Cl.
*H04M 1/72* (2006.01)

(52) U.S. Cl.
USPC ................. 455/414.1; 379/142.17

(58) Field of Classification Search
None
See application file for complete search history.

(56) References Cited

To view the complete listing of prior art documents cited during the proceeding for Reexamination Control Number 90/012,780, please refer to the USPTO's public Patent Application Information Retrieval (PAIR) system under the Display References tab.

*Primary Examiner* — Kenneth J Whittington

(57) ABSTRACT

In a communication terminal device, the connecting state of a call can certainly and easily be controlled without learning troublesome operating methods which are different depending on the connecting state of a call by providing controller for displaying processing items available to a call a display and controlling the call into the connecting state corresponding to the processing item which is selected and determined by the user's operation of an input unit, the user can control the connecting state of the call by merely selecting the desired processing item.

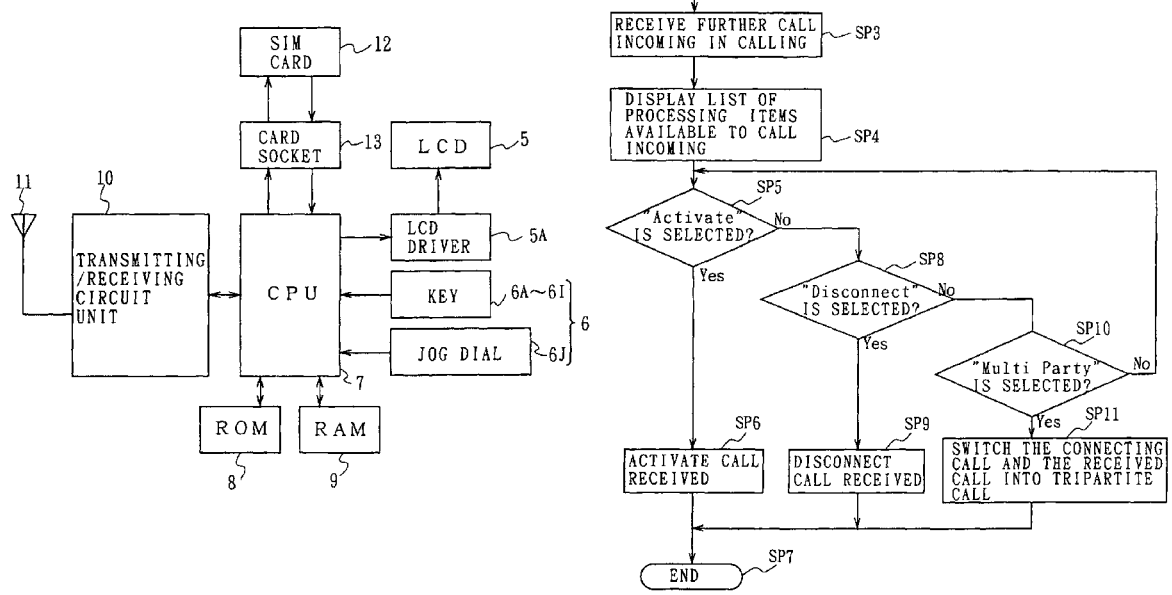

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1 and 10 is confirmed.
Claims 17-22 and 27-32 were previously cancelled.
Claim 26 is cancelled.
Claims 2-9, 11-16, 23-25 and 33-57 were not reexamined.

\* \* \* \* \*